Dec. 1, 1931. A. W. HALLETT 1,834,276
GLOBE CHECK VALVE
Filed Oct. 3, 1927
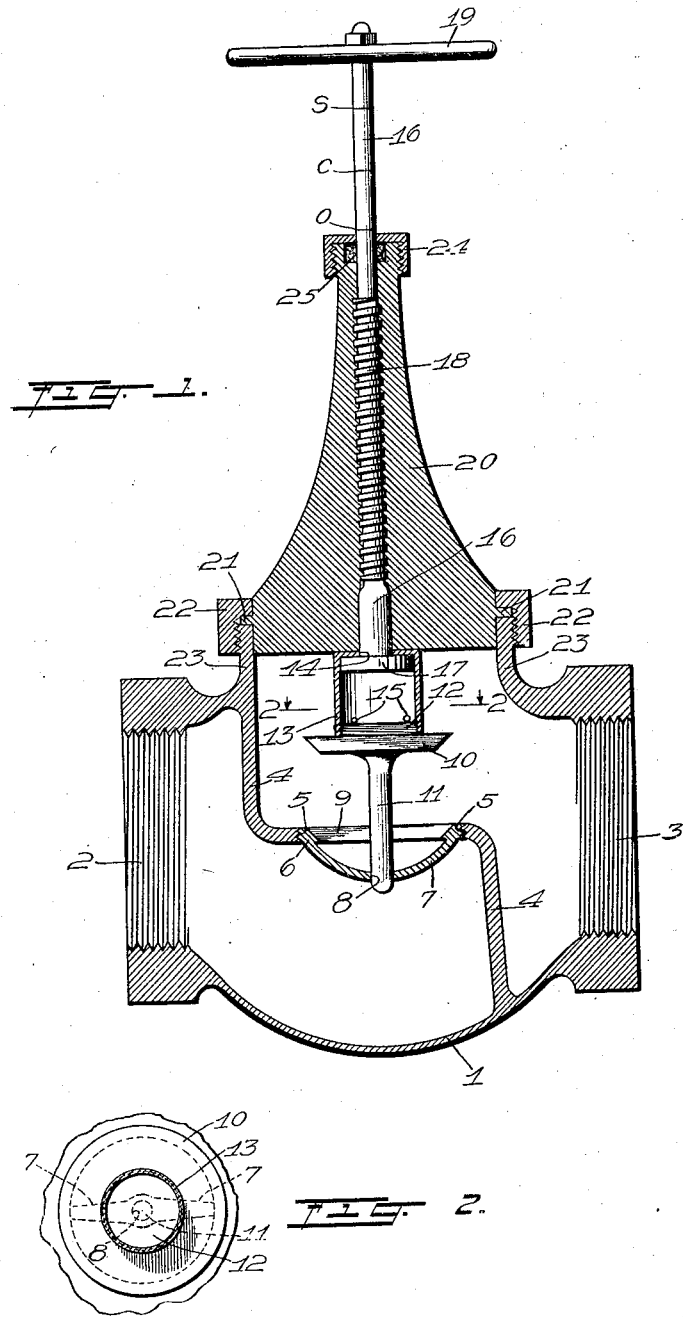
INVENTOR
A. W. HALLETT
BY *Munn & Co*
ATTORNEY Patented Dec. 1, 1931

1,834,276

UNITED STATES PATENT OFFICE

ANDIE WEBB HALLETT, OF GOZA, OKLAHOMA

GLOBE CHECK VALVE

Application filed October 3, 1927. Serial No. 223,741.

My invention relates to improvements in globe-check valves, and it consists in the combinations, constructions, and arrangements herein described and claimed.

This invention is an improvement in that type of valve which is used as a globe valve or a check valve. Such valves are very useful in connection with pumps where a full flow is desired at one time or where priming operations are necessary at others.

An object of my invention is to provide a valve in which the valve member proper is positively held to its seat when it is desired to close the valve, but which may be so adjusted as to permit the valve to operate as a check valve.

A further object is to provide a valve of the type described having a removable valve seat, thereby facilitating the grinding of the valve seat if necessary, and insuring a tight closure.

A further object is to provide simple means for guiding the valve member proper in its various movements.

A further object is to provide means for holding the valve member rigidly in its full open position, as well as in its closed position.

Other objects and advantages will appear in the following specification, and the novel features of the invention will be particularly pointed out in the appended claims.

My invention is illustrated in the accompanying drawings, forming part of this application, in which Figure 1 is a vertical central sectional view through the device, and Figure 2 is a sectional view along the line 2—2 of Figure 1.

In carrying out my invention, I make use of a valve casing 1 which may be of any suitable shape and which is provided with a threaded inlet opening 2 and a similar outlet opening 3, and which has the usual partition wall 4. This wall has a circular opening, the walls of which are threaded as shown at 5. Within this opening is disposed a ring 6 which is threaded externally to engage the threads 5 of the walls of the opening and which is provided with a curved guide member 7 having an opening 8. On the opposite side, the ring is beveled, as shown at 9, to provide a seat for the valve proper.

The valve member is shown at 10. It is provided with an extension or stem 11 arranged to enter the opening 8. The valve member 10 has a threaded portion 12 which is screwed into a hollow cylindrical member 13 having an opening 14 at the opposite end thereof. Smaller openings 15 are provided near the valve member 10 for a purpose hereinafter described.

A stem 16 is arranged to pass through the member 13 and is provided with a head 17. This stem is threaded at 18 and is provided with a handle 19.

The valve casing 1 above the partition 4 is provided with a circular opening. A closure member 20 is provided. It has a portion which enters the opening and has an outwardly extending flange 21 which is arranged to bear on the walls of the casing adjacent the opening. A collar 22 has a portion which overlies the flange 21 and which, when screwed to the portion 23 of the casing, secures the closure member firmly. The closure member 20 is bored to receive the stem 16 and is threaded to engage the threads 18 of the stem. At the top of the closure, there is a cap 24 which is screwed to the closure member, a packing gland 25 being provided for the stem 16, which at this point is reduced, as shown.

From the foregoing description of the various parts of the device, the operation thereof may be readily understood. In the position shown in Figure 1, the valve is open. In this position, the stem 16 is turned as far as it will go. The cylindrical member 13, together with the head 17 of the stem, forms a swivel connection, so that when the valve is open, the member 13 may be held securely against the under side of the closure 20. The valve being guided by the stem 11 is now held rigidly in position.

When it is desired to use the valve as a check valve, the handle 19 is turned to bring the head 17 and the valve member 10 nearer the valve seat. In order to facilitate the operation of the valve, I prefer to mark the stem with three indicating marks, such as those shown at o, c and s, to indicate the open position, check position, and shut position. Thus, when the stem is moved to the check position, the valve member 10 will be seated on the seat 9 whenever there is any tendency for a reverse flow of the water, but will readily open during a forward flow. Thus in priming a pump, the valve may be set so as to operate as a check valve. When it is desired to close the valve, the handle is turned to bring it into the position s. The head 17 will then bear on the upper portion of the valve member and hold it positively on the seat 9. Should any sand work into the interior of the member 13, it will work out at 15 and thus will not interfere in the operation of the device.

The provision of the removable valve seat renders the facing of the seat easy. When it is desired to replace the seat, the closure member 20 may be removed, together with the valve, when the seat may be easily removed and replaced.

I am aware that devices of this type are not broadly new, but in the present instance I provide a device which can be used as a globe valve or a check valve and in which the valve member is positively held in its open or closed positions and is guided at both ends when it serves as a check valve.

It will be noted that the threaded portion 12 is provided with left-hand threads so that any back pressure on the valve which might tend to hold it when the valve is being opened by manipulation of the handle 19 will fail to unscrew the valve from the cylindrical member 13 due to any friction that might exist between the members 17 and the upper end of the casing. Since the threaded portion has left-hand threads, any such back pressure will tend to screw the valve more tightly to the cylinder 13.

I claim:

1. A globe-check valve comprising a valve casing having an inlet and an outlet opening, a partition between said inlet opening and the outlet opening and provided with a threaded opening, a threaded ring secured in said threaded opening and having a valve seat, a disc member provided with an edge constituting a valve for engagement with said valve seat, said disc being provided with a threaded boss upon one side and a stem upon the other side, said threaded ring being provided with a member having an opening therein for slidably receiving said stem, a hollow cylindrical member having a threaded end for receiving said threaded boss and provided with an opening in the opposite end, a threaded stem arranged to project through the opening in the cylindrical member and having a head disposed within the cylindrical member to constitute a swivel, and a closure for said valve casing having a threaded bore to receive said threaded stem, said stem being arranged to be moved for positioning the disc upon said valve seat and said hollow cylindrical member being shaped to permit the disc to be lifted away from the valve seat in one direction and independently of the threaded stem, said threaded stem being further arranged to firmly hold the hollow cylindrical member between its head and said closure.

2. A globe-check valve comprising a valve casing having an inlet and an outlet opening, a partition between said inlet opening and the outlet opening and provided with a threaded opening, a threaded ring secured in said threaded opening and having a valve seat, a disc member provided with an edge constituting a valve for engagement with said valve seat, said disc being provided with a threaded boss upon one side and a stem upon the other side, said threaded ring being provided with a member having an opening therein for slidably receiving said stem, a hollow cylindrical member having a threaded end for receiving said threaded boss and provided with an opening in the opposite end, a threaded stem arranged to project through the opening in the cylindrical member and having a head disposed within the cylindrical member to constitute a swivel, and a closure for said valve casing having a threaded bore to receive said threaded stem, said stem being arranged to be moved for positioning the disc upon said valve seat and said hollow cylindrical member being shaped to permit the disc to be lifted away from the valve seat in one direction and independently of the threaded stem, said threaded stem being further arranged to firmly hold the hollow cylindrical member between its head and said closure, said hollow cylindrical member being provided with outlet openings in its walls near the end of the threaded boss.

A. W. HALLETT.